United States Patent [19]

Kajitani et al.

[11] Patent Number: 5,581,735
[45] Date of Patent: Dec. 3, 1996

[54] SYSTEM FOR SUPPLYING UNIT IMAGE DATA TO REQUESTING USERS FROM MULTIPLE STORAGE DEVICES BASED ON DIRECTORY INFORMATION AND TOKEN QUEUES IDENTIFYING THE REQUESTER AND DATA

[75] Inventors: Kouichi Kajitani, Kawasaki; Kazuya Kosaka, Kashiwa, both of Japan

[73] Assignee: International Business Machines Corporation, Armonk, N.Y.

[21] Appl. No.: 198,232

[22] Filed: Feb. 17, 1994

[30] Foreign Application Priority Data

Feb. 18, 1993 [JP] Japan ..................... 5-029289

[51] Int. Cl.⁶ .......................... G06F 13/14; G06F 13/00
[52] U.S. Cl. .................. 395/496; 395/475; 395/859; 364/228.1; 364/243.6; 364/243.7; 364/246.4
[58] Field of Search ........................ 395/280.08, 872, 395/873; 348/7; 358/85

[56] References Cited

U.S. PATENT DOCUMENTS

| | | | |
|---|---|---|---|
| 4,028,675 | 6/1977 | Frankenberg | 340/172.5 |
| 5,130,792 | 7/1992 | Tindell et al. | 358/85 |
| 5,226,126 | 7/1993 | McFarland et al. | 395/375 |
| 5,341,474 | 8/1994 | Gelman et al. | 395/200 |
| 5,371,532 | 12/1994 | Gelman et al. | 348/7 |
| 5,442,389 | 8/1995 | Blahut et al. | 348/7 |

*Primary Examiner*—Thomas C. Lee
*Assistant Examiner*—Marc K. Weinstein
*Attorney, Agent, or Firm*—Ronald L. Drumheller

[57] ABSTRACT

The invention uses a storage device effectively to supply data to as many user terminals as possible. Sub-control units read unit data in which dynamic image data having continuity is divided and compressed from storage devices sequentially according to the tokens stored in queues of a system control unit, and supplies buffers corresponding to storage devices through a change-over switch for connection corresponding to the tokens. The unit data stored in the buffers is supplied to terminals as analog data of dynamic image through expanders and D to A converters. Therefore, the unit data from K units of storage devices to M (K * N) units of terminals at the substantially same time.

2 Claims, 9 Drawing Sheets

SYSTEM FOR SUPPLYING UNIT IMAGE DATA TO REQUESTING USERS FROM MULTIPLE STORAGE DEVICES BASED ON DIRECTORY INFORMATION AND TOKEN QUEUES IDENTIFYING THE REQUESTER AND DATA

FIELD OF THE INVENTION

The present invention relates to a data supplying apparatus, and more particularly, to a data supplying apparatus, like a computer, for transmitting digital image data such as dynamic images (animation) or continuous images that are continuous in time.

BACKGROUND OF THE INVENTION

There have been conventionally used user terminal devices which display on a monitor or the like an image according to digital image data supplied from an image data supplying apparatus such as a computer. The image includes static images continuous in time. The images are continuously displayed so that the dynamic image of a work (movies or animation) can be displayed.

In the above mentioned data supplying apparatus, the digital data (unit data) of a plurality of static images which are components of dynamic images are stored in a storage device in advance. In accordance with requests from a number of user terminals, the unit data which is requested for display is sequentially read from the storage device, and supplied to the user terminals. Thus, the dynamic image is displayed on the user terminals. Since the amount of data of the dynamic image of a digitized work is generally enormous, the digital data of the dynamic image has been frequently compressed in order to reduce the capacity of the digital data by employing a data compression technique, and then stored in a storage device (for example, a hard disk device).

Furthermore, according to this data supplying apparatus, the continuous digital image data is supplied to the plurality of user terminals without being interrupted from one storage device by utilizing a difference between the speed of reading the unit data from the storage device (hard disk device) and the speed of transmitting the unit data to the user terminals. That is, assuming that the speed of reading the unit data from the storage device is T bits/second (a value obtained by dividing the size of data to be read by the sum of the maximum seek time, the maximum rotation waiting time, and the data transfer time, for example, 30M bits/second), this data reading speed T is faster than a speed D bits/second (for example, 1.5M bits/second) required for processing the unit data in the user terminal. Thus, while the unit data is being processed in one user terminal, the data supply to this user terminal is completed. Therefore, the number N of the user terminals which simultaneously process the same work can be determined in accordance with the following equation (1).

$$N = int(T/D) \quad (1)$$

Where, int (x) designates a maximum integer which does not exceed x.

An image communication system has been known, as an apparatus similar to the above mentioned data supplying apparatus, which supplies digital image data in such a way that a dynamic image is simultaneously displayed on a plurality of user terminals (refer to PUPA No. 2-188082). This image communication system is adapted to fetch digital image data from one data base corresponding to the storage device, to multiplex it by a multiplexing separator, and to supply the data to a plurality of user terminals.

STATEMENT OF PROBLEMS WITH THE PRIOR ART

According to the above mentioned data supplying apparatus, although the number of the user terminals which can be coupled to one storage device may be increased up to N, it is necessary to prepare a plurality of storage devices n in which the same digital image data is stored in order to supply the digital image data to the user terminals after the Nth user terminal. It is undesirable to merely increase the number of storage devices in this manner from an economic point of view. Furthermore, the storage devices are not effectively utilized in storing the same digital image data in the plurality of storage devices.

Similarly, in the case where the number of the storage devices is increased up to K, a dynamic image work is stored in each of the storage devices and the digital image data of one work is supplied and displayed by switching means or the like and displayed, the number of the user terminals to which the digital image data can be simultaneously supplied From one storage device is limited to N obtained in the above described equation (1). Accordingly, if the requests from more than N user terminals are concentrated to one storage device (work), a contention inevitably occurs for the digital image data to be supplied. Therefore, the digital image data which is requested by the user terminals cannot be supplied thereto.

OBJECTS OF THE INVENTION

In order to overcome the above mentioned problems, an object of the present invention is to provide a data supplying apparatus in which storage devices can be effectively utilized and digital image data can be supplied to as many user terminals as possible without being interrupted.

SUMMARY OF THE INVENTION

For attaining the above mentioned object, a data supplying apparatus according to the invention comprises a plurality of storing means for storing continuous data as unit data divided into units; a plurality of processing means for processing data supplied from the storing means; connecting means for connecting the processing means to the storing means so as to make the processing means correspond to the storing means; and control means for controlling the storing means such that the unit data is supplied in a predetermined order to the predetermined processing means and for controlling the connecting means such that the respectively corresponding storing means and processing means are connected.

An alternative embodiment of the data supplying apparatus according to the invention comprises the connecting means as a switching means for switching a connecting path between the processing means and the storing means in accordance with a connection request input from the processing means to the control means.

Another alternative embodiment of the data supplying apparatus according to the invention comprises the connecting means as a network system for transmitting the unit data from the storing means to the predetermined processing means in accordance with the connection request input from the processing means to the control means.

An additional alternative embodiment of the data supplying apparatus according to the invention comprises the unit data that is sequentially distributed and stored in each of the storing means for every cycle having the number of the storing means.

A further alternative embodiment of the data supplying apparatus according to the invention comprises each of the plurality of processing means with a plurality of buffers, the unit data being temporarily stored in each of the buffers, and the control means having queues of the number corresponding to the number of the storing means which can hold N tokens corresponding to the request from the processing means, when a speed N times faster than the speed required for processing the data in the processing means corresponds to the speed required for transmitting the data from the storing to the processing means, and sequentially read the unit data corresponding to the tokens held by the queues from the storing means.

Another further alternative embodiment of tile data supplying apparatus according to the invention comprises the plurality of processing means that includes a display means for displaying the animated image based on the input data.

In general, the data supplying apparatus according to the invention includes a plurality of storing means. Each of the storing means stores a plurality of continuous data as unit data divided into units. The plurality of storing means is connected to a plurality of processing means by a connecting means in such a way that each of the storing means corresponds to each of the plurality of processing means. The connecting means may be a switching means for switching a connecting path between the processing means and the storing means in accordance with a connection request (token) input to the control means from the processing means. Also the connecting means may be a network system for transmitting the unit data to the predetermined processing means from the storing means in accordance with the connection request input to the control means from the processing means. Each of the processing means processes the data supplied from the storing means. The processing means includes a user terminal having a keyboard and a display means such as a display. A dynamic image can be displayed on the processing means such as the user terminal by using digital image data of a work with continuity in dynamic images such as a motion picture as tile data to be processed by the processing means, and by using tile display means for displaying the dynamic images based on input data. The control means controls the storing means such that the unit data is supplied in a predetermined order to a predetermined processing means, and controls tile connecting means such that respectively corresponding storing means and processing means are connected. Thus, the digital image data such as a dynamic image is not concentratedly output from one storing means, but can be supplied from each of a plurality of storing means so that the storing means can be efficiently utilized.

The unit data to be stored in the plurality of storing means can be sequentially distributed and stored in each of the storing means for every cycle having the number of the storing means. That is, data can be stored in the plurality of storing means by unit data in a predetermined order of the storing means. For example, digital image data of the dynamic image of a work such as a motion picture can be sequentially stored in a plurality of storing means as data divided into unit data. Therefore, the digital image data such as a dynamic image is not concentratedly output from one storing means, but can be sequentially supplied from each of a plurality of storing means for every cycle having the number of the storing means so that the plurality of storing means can be efficiently utilized.

Furthermore, each of the plurality of processing means can have a plurality of buffers, and the unit data can be temporarily stored in each of the buffers. Therefore, the unit data can be processed as continuous data without being interrupted by sequentially reading the unit data from the plurality of buffers. In addition, when N times the speed required in processing by the processing means corresponds to the speed required for transmitting data from the storing means to the processing means, the processing means has queues, which can hold N tokens corresponding to requests From the processing means, in the number corresponding to that of the storing means. The control means sequentially reads from the storing means the unit data for the tokens held in the queues. Accordingly, the unit can be output from each of the plurality of storing means to the processing means substantially at the same time, and the unit data for N tokens held in the queues in each storing means can be supplied during processing by one processing means, so that the data can be supplied to processing means in the number N times that of the plurality of storing means substantially at the same time.

DESCRIPTION OF SYMBOLS

Figure 1:
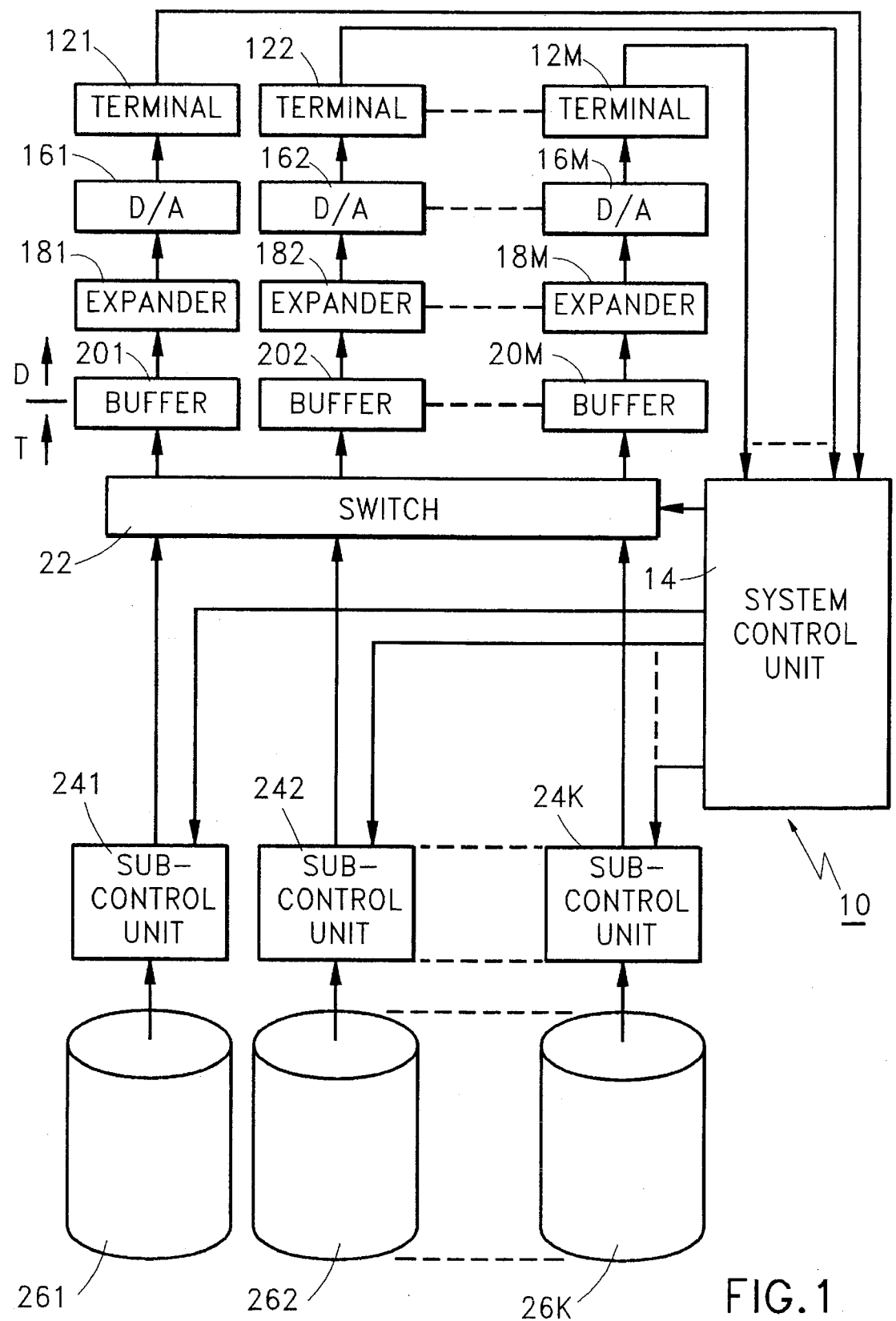
FIG. 1 is a schematic block diagram illustrating a data supplying apparatus of the first embodiment according to the invention.

10 . . . data supplying apparatus
14 . . . system control unit
22 . . . change-over switch
42 . . . token
121–12M . . . user terminals
201–20M . . . buffers
241–24K . . . sub-control units
261–26K . . . storage devices
401–40K . . . queues

DETAILED DESCRIPTION OF THE INVENTION

Now, preferred embodiments of this invention will be explained in detail by referring to the drawings. The first embodiment is a data supplying apparatus to which this invention is applied and which supplies digital image data of a dynamic image (hereinafter called "dynamic image data")through an analog line for displaying dynamic images such as a motion picture or animation on monitors of a plurality of user terminals.

As shown in FIG. 1, the data supplying apparatus 10 according to this embodiment comprises a plurality of user terminals 12₁–12M (M being an integer greater than 1), and a system control unit 14 to which each of the user terminals 12₁–12M is connected through an analog line. Here, each of the user terminals 12₁–12M has a monitor, not shown, for displaying an image and a keyboard for entering various commands.

The system control unit 14 is connected to a plurality of sub-control units 24₁–24K (K being a natural number, $K \leq M$). Each of sub-control units 24₁–24K is for controlling reading of data stored in a storage device such as a hard disk, and connected to respective storage devices 26₁–26K which store unit data which is divided and compressed dynamic image data (to be described later). In addition, the sub-control units 24₁–24K are connected to a change-over switch 22. This change-over switch 22 is also connected with the system control unit 14.

The change-over switch 22 connects to a plurality of buffers 20₁–20M. The buffers 20₁–20M connect to expanders 18₁–18M, respectively. The expanders 18₁–18M connect to the user terminals 12₁–12M through analog-digital converters (hereinafter called "DA converters") 16₁–16M, respectively.

Each of buffers 20₁–20M has two small buffers (X1, X2) which are a p-bit storage area corresponding to the size (capacity) of unit data. The unit data is alternately output from the small buffers X1, X2 of respective buffers 20₁–20M.

Figure 2:
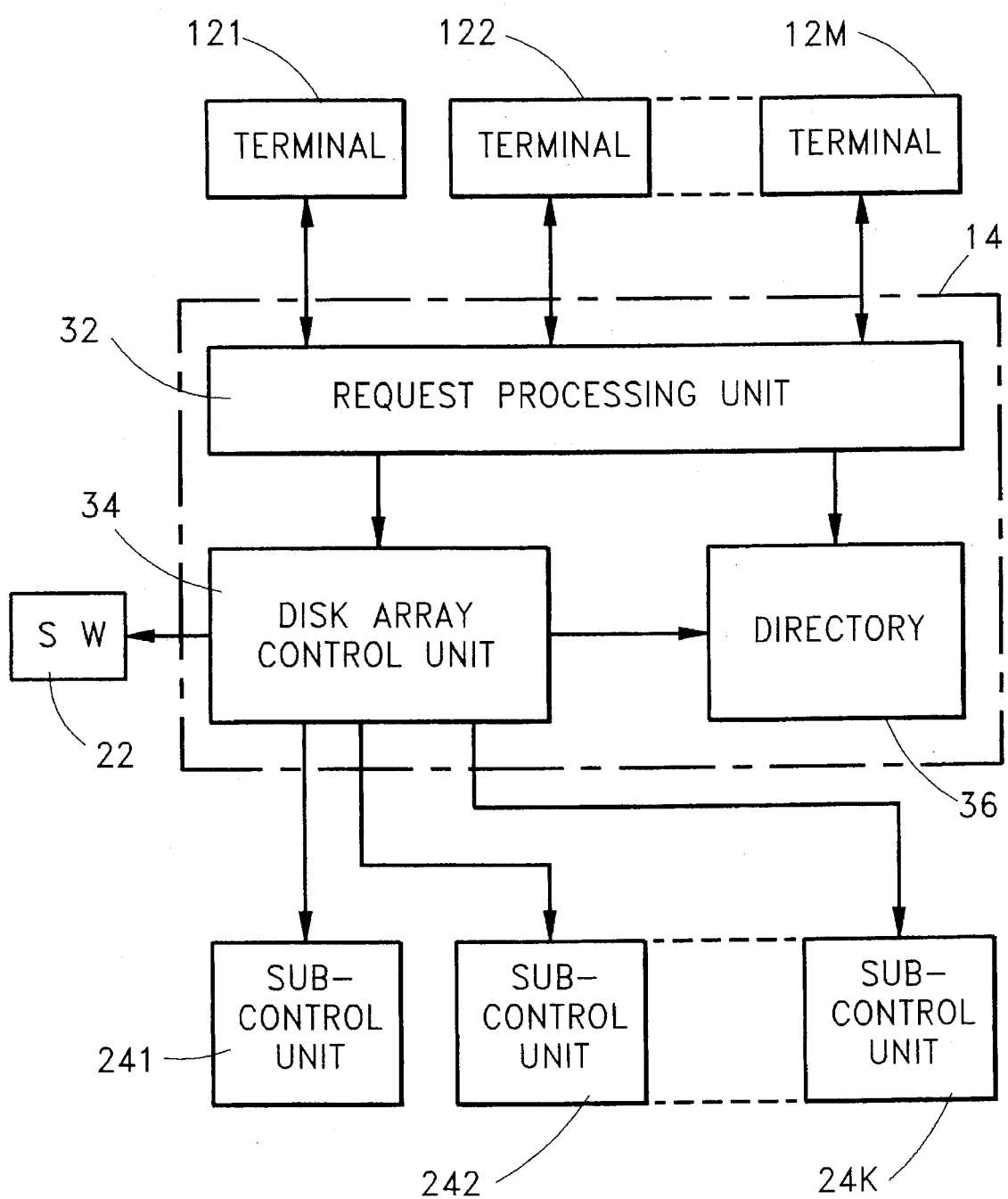
FIG. 2 is a block diagram illustrating a system control unit used in a data supplying apparatus of the first embodiment.

As shown in FIG. 2, the system control unit 14 consists of a request processing unit 32, a disk array control unit 34, and a directory 36. The request processing unit 32 in the system control unit 14 is input with a request signal representing a request for displaying dynamic image data output from the respective user terminals 12₁–12M. The request signal is generated in a form of (Y1, Y2) by using the number of user terminal Y1 and a name of work Y2. The following Table 1 shows an example where the user terminal number YI is 12₁ and the name of work Y2 is A.

TABLE 1

| User terminal No.: Y1 | Name of work: Y2 |
|---|---|
| 12₁ | A |

The request processing unit 32 is connected to the directory 36 and the disk array control unit 34. The directory 36 stores, as shown in the following Table 2, relationship among unit data for a work, a storage device, and location of unit data stored in the storage unit in a form of a table.

TABLE 2

| Name of work | Unit data number | Storage device number | Location in storage device |
|---|---|---|---|
| A | 1 | 1 | R1 |
| A | 2 | 2 | R1 |
| . | . | . | . |
| . | . | . | . |
| . | . | . | . |

TABLE 2-continued

| Name of work | Unit data number | Storage device number | Location in storage device |
|---|---|---|---|
| B | 1 | 1 | R11 |
| B | 2 | 2 | R11 |
| . | . | . | . |
| . | . | . | . |
| . | . | . | . |

The request processing unit 32 generates, in accordance with the input request signal (Y1, Y2), a token in a form of (Y1, Y2, Y3, Y4) using the user terminal number Y1, the name of work Y2, the unit data number Y3 and the location of unit data stored in the storage device Y4 by referring to the directory 36 (Table 2), and outputs it to the disk array control unit 34. The following Table 3 shows an example where the user terminal number Y1 is 12₁, the name of work Y2 is A, the unit data number Y3 is 1, and the location of unit data A1 in the storage device Y4 is R1, as well as another example where the user terminal number YI is 12₂, the name of work Y2 is A, the unit data number Y3 is 2, and the location of unit data A2 in the storage device Y4 is R1.

| User terminal No. | Name of work | Unit data number | Location in storage device |
|---|---|---|---|
| 12₁ | A | 1 | R1 |
| 12₂ | A | 2 | R1 |

Figure 5:
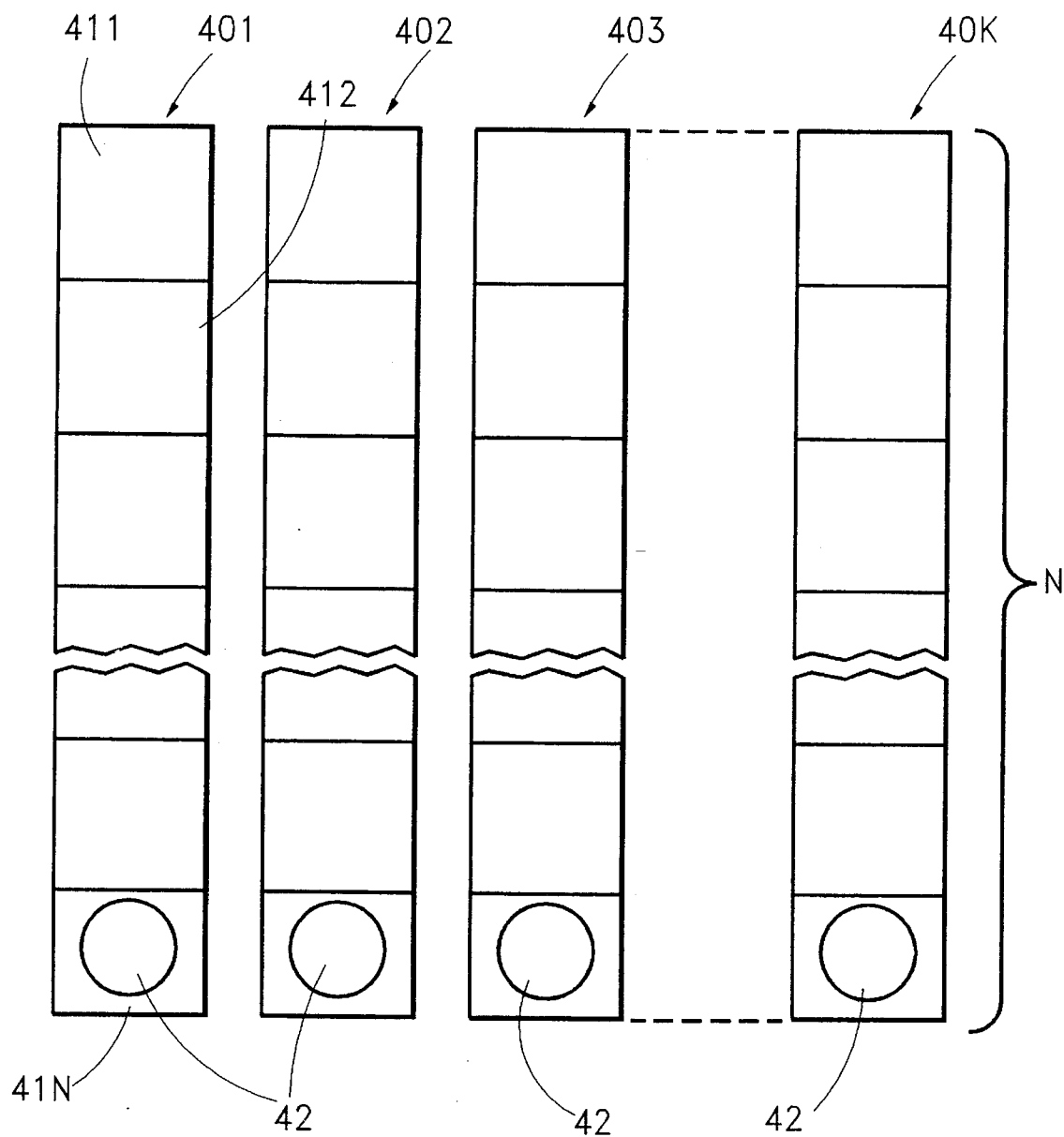
FIG. 5 is an image drawing illustrating a storage condition of each queue.

The disk array control unit 34 has, as shown in FIG. 5, memories, not shown, to form queues 40₁–40K for holding a plurality (N) of tokens 42 for each of the storage devices 24₁–24K. Respective queues 40₁–40K have N token storage areas 41₁–41N. The tokens 42 are stored in an order from the lowest token storage area 41N to the top token storage area 41₁ (From bottom to top in FIG. 5), in all of which no token 42 is currently stored. The token 42 stored in the lowest token storage area 41N is read from the queue. When the token 42 stored in the lowest token storage area 41N is read, the token 42 is shifted from the top token storage area 41₁ toward the lowest token storage area 41N.

Figure 3:
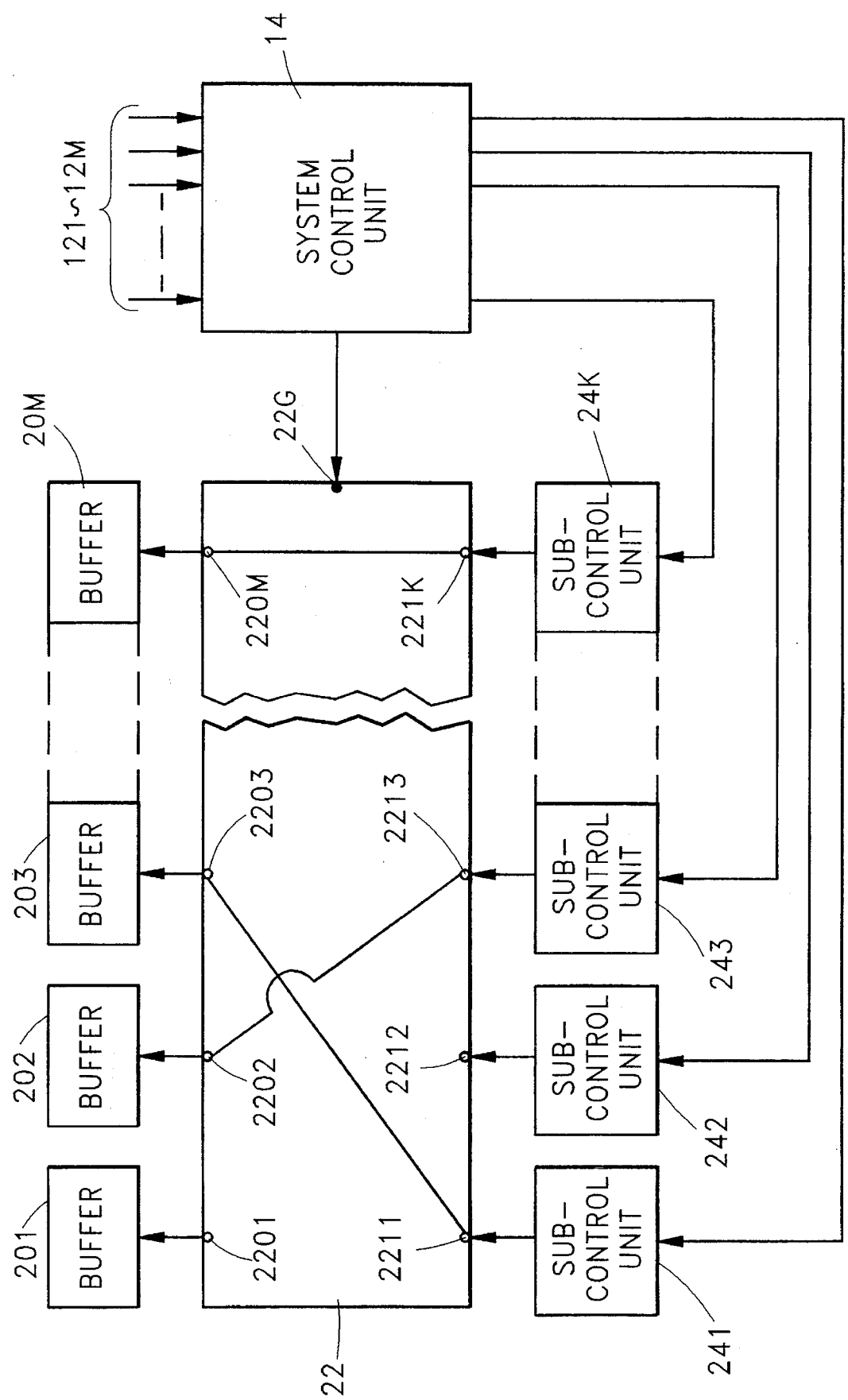
FIG. 3 is an image drawing illustrating a change-over switch used in a data supplying apparatus of the first embodiment.

As shown in FIG. 3, the change-over switch 22 has input terminals 22I₁–22IK, output terminals 22O₁–22OM, and a control terminal 22G. The input terminals 22I₁–22IK are connected to the output terminals 22O–22OM in accordance with a change-over signal input to the control terminal 22G. In FIG. 3, the input terminals 22I1, 22I3 and 22IK are connected to the output terminals 22O3, 22O2 and 22OM in such a manner that one input terminal is connected to one output terminal. The input terminals 22I₁–22IK are connected to the sub-control units 24₁–24K, the output terminals 22O₁–22OM are connected to the buffers 20₁–20M, and the control terminal 22G is connected to the system control unit 14.

Figure 4:
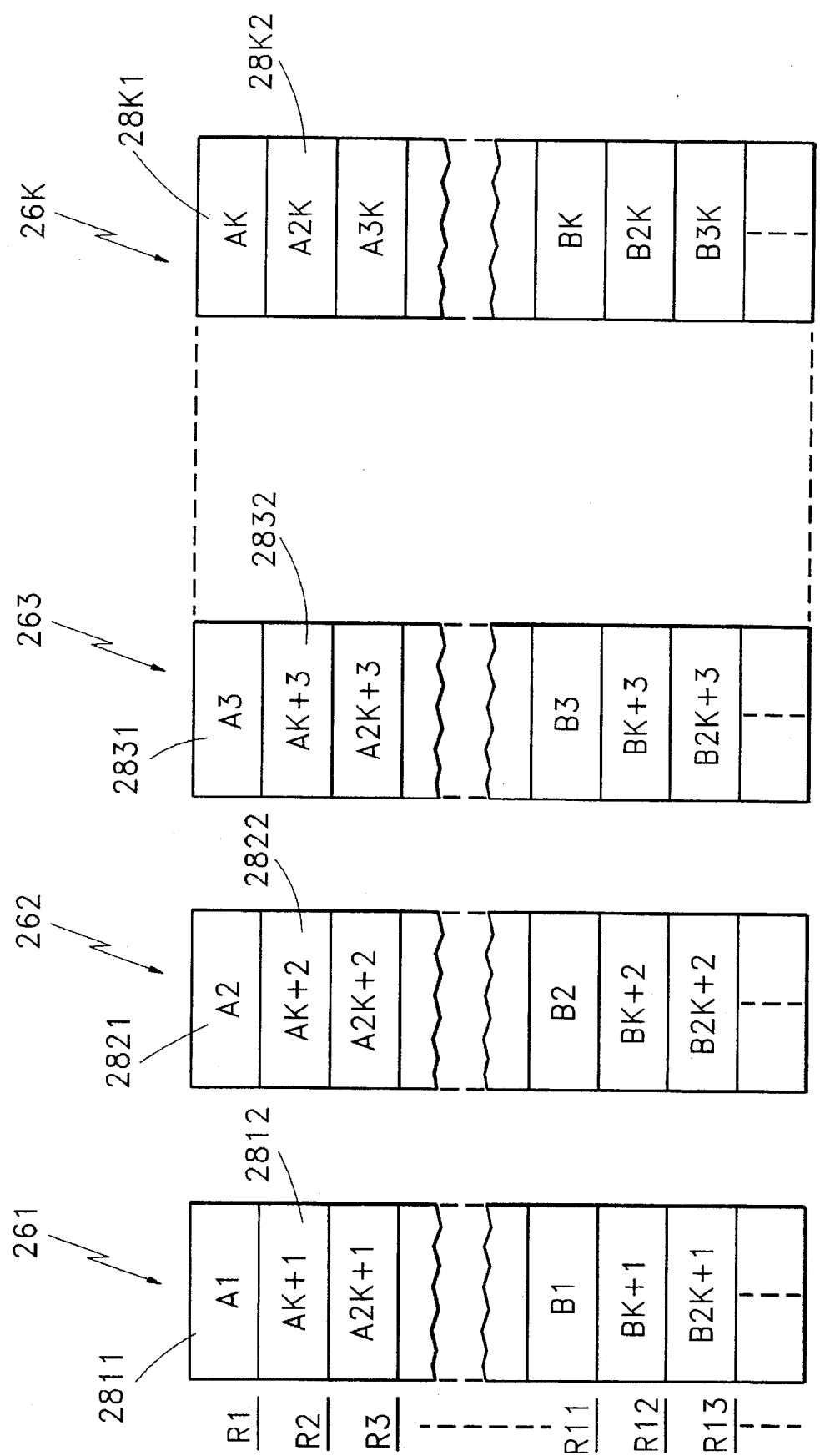
FIG. 4 is an image drawing illustrating a storage condition of each storing means.

As shown in FIG. 4, each of the storage devices 26₁–26K has a plurality of p-bit storage areas 28₁₁, 28₁₂, . . ., storage areas 28₂₁, 28₂₂, . . ., and storage areas 28K1, 28K2, . . .. The unit data of divided and compressed dynamic image data is stored in each of these storage areas. According to this embodiment, the unit data to be stored in the storage devices 26₁–26K is stored in the following order. First, the dynamic image data continuous in time of the work A is continuous in the order of the unit data A1, A2, . . . . The unit data is sequentially stored in the storage area in such a manner that the first unit data A1 containing data on the start point of the dynamic image data is stored in the storage area 2811 of the storage device 261, the next data A2 in the storage area 2821 of the storage device 262, the next unit data A3 in the storage area 2831 of the storage device 263, . . . . Thus, according to this embodiment, when predetermined unit data Ai (i being a natural number) is stored in a predetermined storage device 26j (j: $1 \leq j \leq K$), the next unit data Ai+1 is stored in a storage device 26L at the number L determined by the following equation (2), and the unit data which is continuous and a part of the dynamic image data is distributed over and stored in a plurality of storage devices 261–26K.

$$L=(j \bmod K)+1 \qquad (2)$$

where K represents a value corresponding to the total number of storage devices, (x mod y) representing the remainder when dividing a natural number x by a natural number y. In addition, in each storage device, the unit data is stored in the order of the storage areas 28j1, 28j2, 28j3, . . .

The storage location of the first unit data A1 may be in any storage device as long as the above storing order is met. Moreover, the storing order for the storage device and the storage area is not limited to the one determined by the above equation (2), but may be in a predetermined order.

Now, the relationship of the number of terminals to which the dynamic image data can be supplied from K storage devices without interruption is described by using the data transmission rate. The number N of user terminals to which the unit data can be simultaneously supplied is determined from the above-mentioned equation (1) by using the speed T for reading data from one storage device and the speed D required for processing at the user terminal. For example, assuming in the data supplying apparatus 10 of this embodiment that the speed from the storage device to the buffer is 30 Mbits/second, and the speed D from outputting the unit data from the buffer to processing by the user terminal is 1.5 Mbits/second, N=20, which means that the data can be supplied to 20 user terminals.

In this embodiment, because the unit data is distributed over and stored in each of the storage devices in the above-mentioned order, data of different works or even the same work can be supplied to different user terminals. Therefore, each of K storage devices can simultaneously supply data to the user terminals so that the number M of the user terminal which can supply the dynamic image data without interruption is M (=N * K) at maximum. For example, if there are five storage devices, dynamic image data can be supplied to 100 user terminals.

Furthermore, because, in this embodiment, one work is stored over a plurality of storage devices, but it is not stored in duplicate, it is possible to increase the number of works which can be stored when compared with a case where a plurality of storage devices is used and one work is stored in each storage device to make the number of user terminal N * K.

Figure 6:
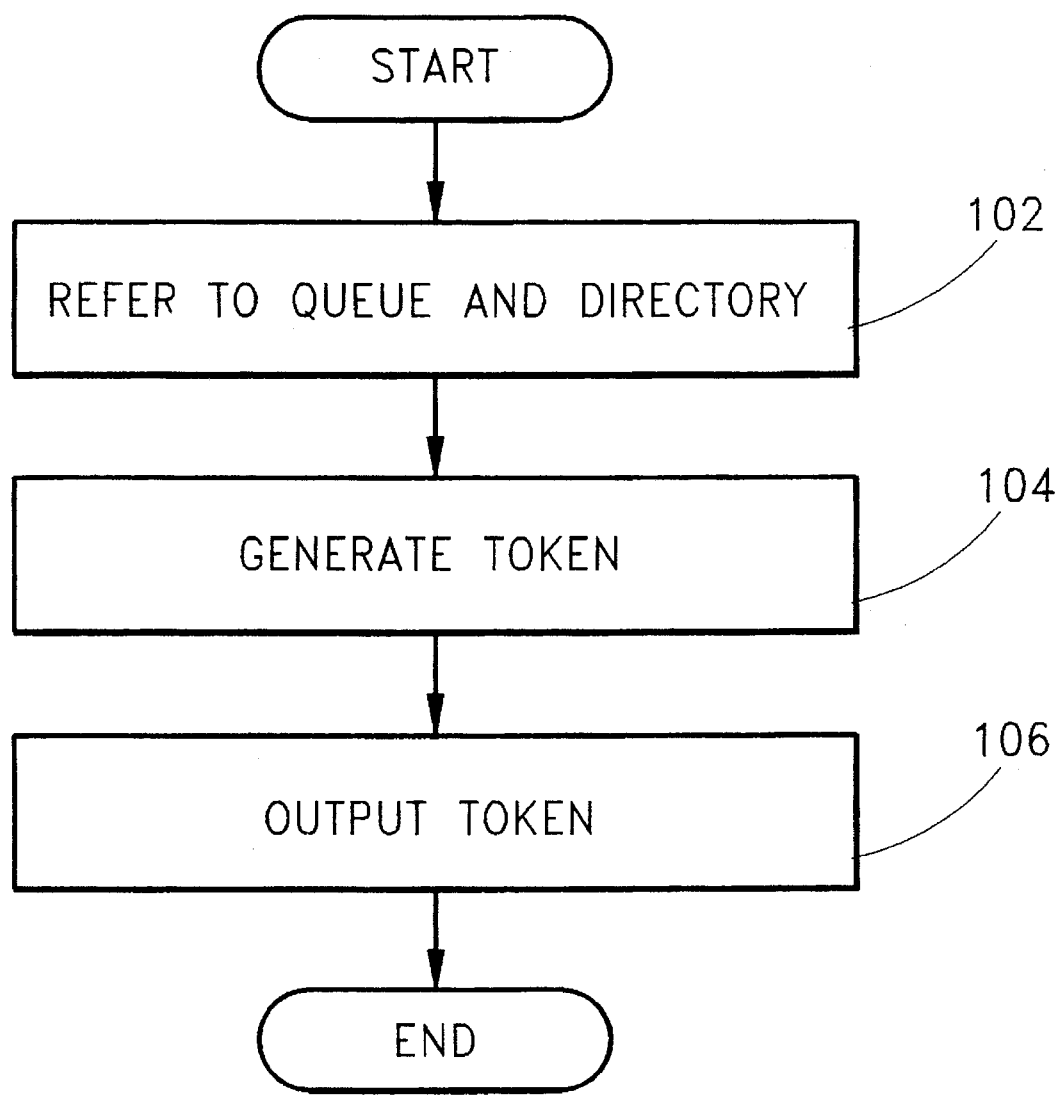
FIG. 6 is a flowchart illustrating the initial token creating routine of a request processing unit of the first embodiment.

Now, the operation of this embodiment is described. When an operator enters the name of work to be viewed by a keyboard, not shown, a request signal (Y1, Y2) is output to the request processing unit 32 in the system control unit 14. The request processing unit 32 executes an initial token producing routine shown in FIG. 6 to generate the first token 42 corresponding to the input request signal by referring to the table in directory 36 (Table 2) (steps 102 and 104). Then, it refers to the queues 401–40K in the disk array control unit 34, and outputs the generated token 42 so as to be stored in the lowest token storage area (FIG. 5), which currently stores no token 42, in the queue corresponding to the storage device in which the unit data for the generated token 42 is stored (step 106). That is, when the work A is requested from the user terminal 121, to first output the top unit data A1 of the work A, the token is stored in the lowest token storage area of the queue 401 of the storage device 261 in which the unit data A1 is stored.

However, in step 106, if N tokens have been stored in the queue, that is, if N communications have been authorized, the generated token is output and stored after when the disk array control unit 34 processes the token in the lowest token storage area, as described later, and the number of tokens in the queue becomes N–1.

Figure 7:
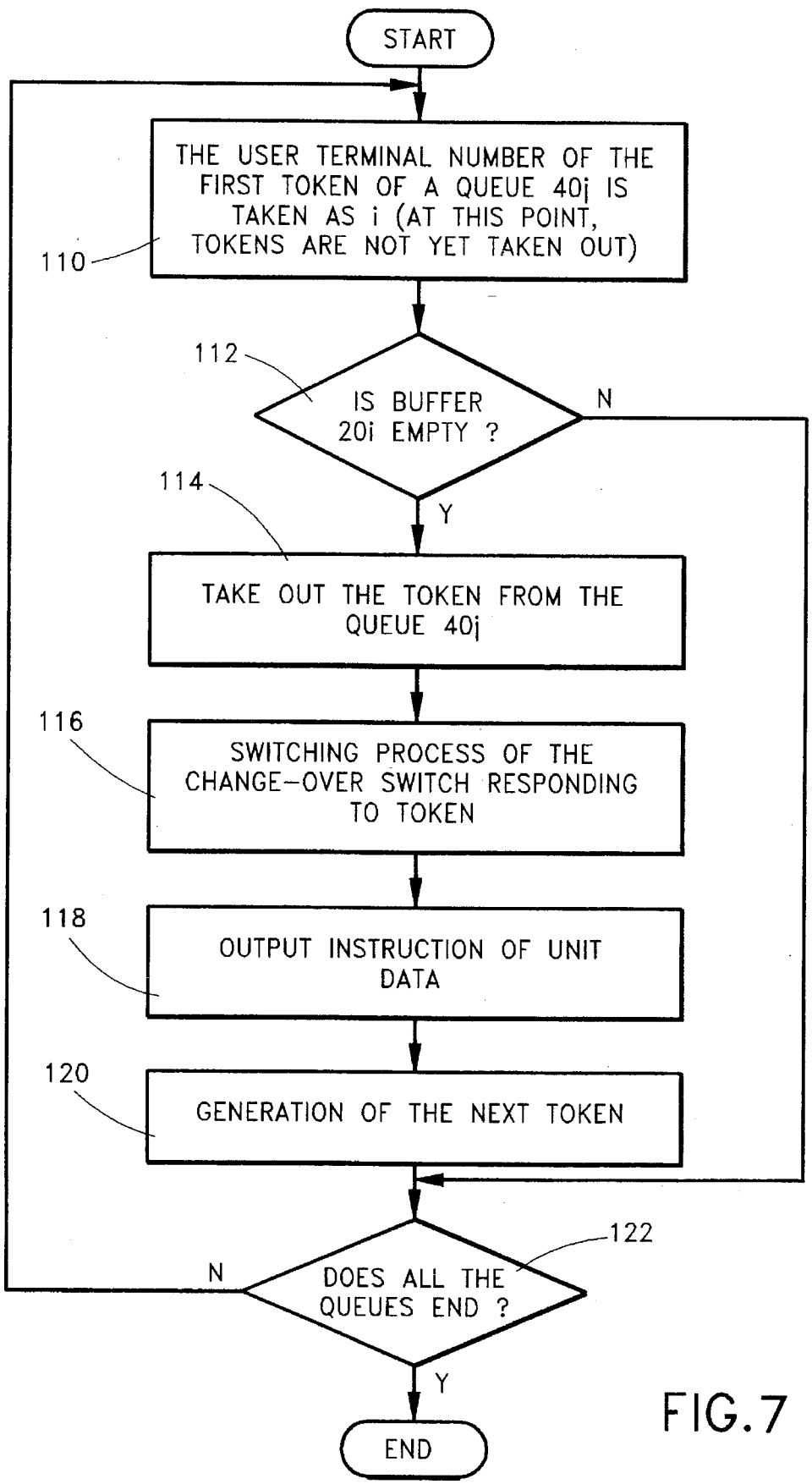
FIG. 7 is a flowchart illustrating the details of a token processing control of the first embodiment.

Next, processing of tokens stored in the queue 401–40K of the disk array control unit 34 is described. The disk array control unit 34 executes a token processing routine shown in FIG. 7 in every predetermined time S.

In step 110, the process "snoops" the queue 40j ($1 \leq j \leq K$) and makes it the number of the user terminal for the lowest (first) token i. Step 112 determines whether at least either one of the small buffers X1 or X2 in the buffer 20i ($1 \leq i \leq M$) is empty. This determination is made to avoid collision of the unit data to be output. This embodiment starts execution with the buffer 201 according to the storing order of the unit data for the work. If it is affirmative in step 112, the process proceeds to step 114 to start the processing for the token stored in the queue. On the other hand, if it is negative, the process proceeds to step 122.

Step 114 fetches the stored token 42 from the lowest token storage area 41N of each queue 40j and proceeds to step 116. Step 116 connects the buffer and the sub-control unit so that the unit data corresponding to the token 42 is output to the user terminal by switching the change-over switch 22 based on all fetched tokens 42.

In the next step 118, the unit data corresponding to each token 42 is output from the storage device 26j by outputting an instruction for outputting the unit data to the sub-control unit 24j. In this case, the unit data A1 corresponding to the work A requested by the user terminal 121 is stored in either one of small buffers X1 or X2 of the buffer 201. In the user terminal 121, the unit data A1 stored in the buffer 201 is expanded by the expander 181, converted into analog signals by the DA converter 161, and output to the user terminal 121 through an analog line, not shown. Dynamic display of the requested work A is started on the user terminal 121.

When the output of the unit data is completed, it proceeds to step 120. In step 120, a token 42 is generated for outputting the next unit data continuous in time to the read unit data to complete this routine. The generation of this next token continuous in time generates a token with the next unit data number for the same name of work based on the requested name of work and the output unit data, and stores it in a token storage area, which is empty and at a lower order, of the storage device in which the unit data for the generated token is stored.

In step 120, if the unit data for the processed token is the last unit data for the work, the process does not generate the next token, but proceeds to step 122.

When the generation of the next token (step 120) is completed, it is determined in step 122 whether or not the processing of all the queues 401–40K is completed. If not, the process returns to step 112 to process the next queue, otherwise, completes this routine.

The processing time for steps 112–122 is shorter than that of processing by the user terminal. Thus, if the predetermined time S is set to the time required for reading the data unit from the storage device, output of one unit data from each of K storage devices in total can be completed within tile time required for reading one unit data even if the above processing is performed for all the queues.

Figure 8:
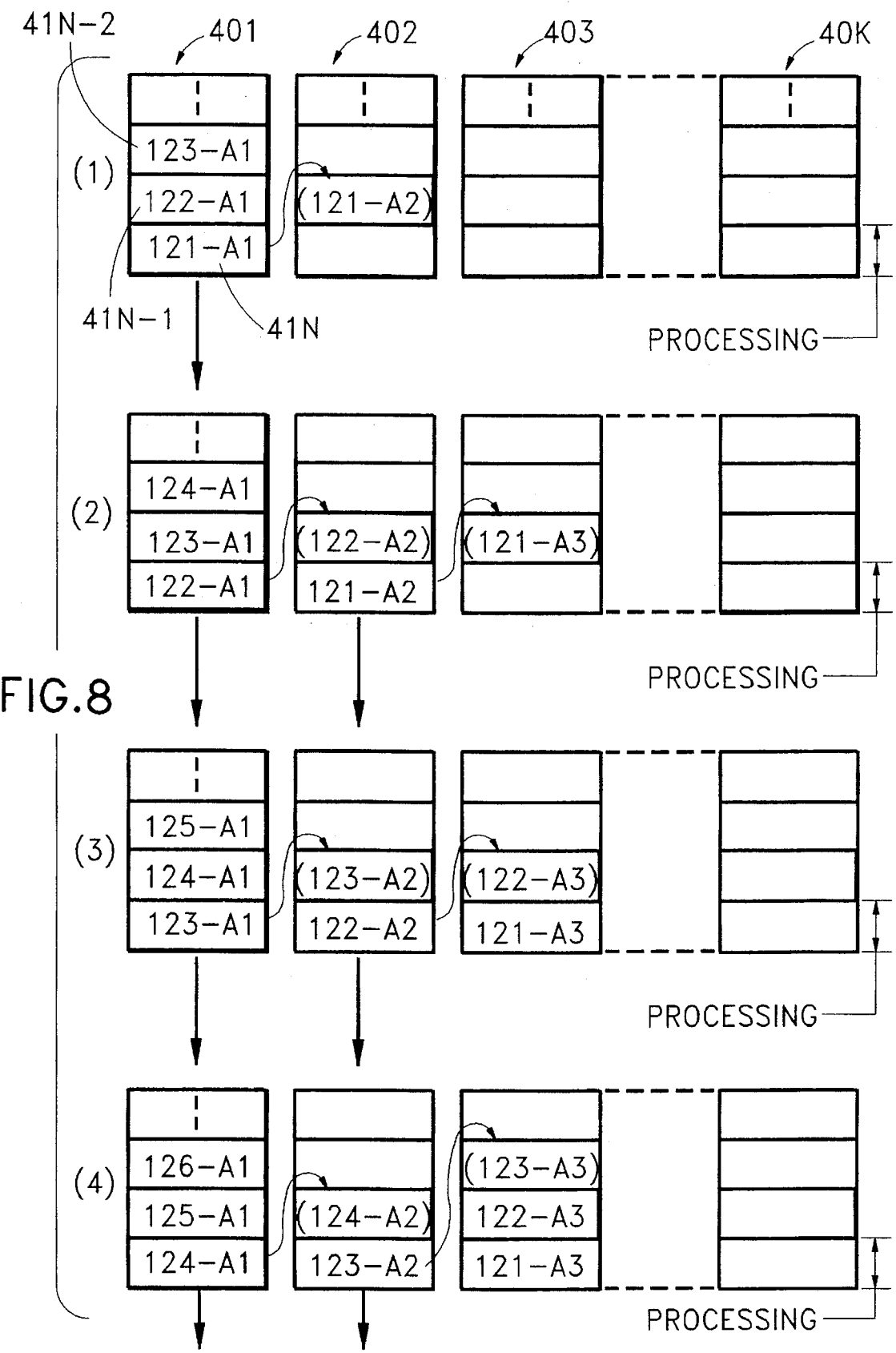
FIG. 8 is an image drawing for explaining a process in which a queue is processed.

Next, the processing of all the queues 401–40K is described by referring to FIG. 8. Here, it is assumed that all the small buffers X1, X2 of the buffers 201—20M are empty. First, in a case where all the work requests from N user terminals are for a work A, and the first request is one from the user terminal 121, only the queue 401 is filled with the tokens 42. In the following, the token 42 is expressed only by using the symbol representing the user terminal and the symbol representing the unit data for a work. For example, if a token 42 represents the unit data A1 of a work A for a user terminal 121, it is abbreviated as token (121-A1).

Next, the processing mentioned above is carried out and the lowest level token storage area 41N of all the queues 401–40K is processed In this case, since there are tokens only in queue 401, as shown in FIG. 8 (1), a token (121-A1) is processed, unit data A1 is stored in a small buffer X1 of buffer 201, and the next token (121-A2) is stored in a lower level token storage area of the empty space of queue 402. At this time, since the lowest level token storage area 41N of queue 402 is an object to be processed, the token (121-A2) is stored in a lower level token storage area 41N–1 next to the lowest level token storage area. When the lowest level token storage areas 41N of all the queues 401–40K are processed, the tokens which are not yet processed are stored in (shifted to) a lower level storage area one by one.

In the next processing, since queues 401 and 402 are filled with tokens, as shown in FIG. 8 (2), they are processed sequentially. Unit data A1 is stored in a small buffer X1 of a buffer 202 and unit data A2 is stored in a small buffer X2 of a buffer 201. After that, a token (122-A2) next to the token (122-A1) which is processed in queue 401 is generated and the generated token (122-A2) is stored in a lower level token storage area 41N-1 of the empty space of queue 402. A token (121-A3) next to the token (121-A2) which is processed in queue 402 is generated and the generated token (121-A3) is stored in a lower level token storage area 41N-1 of the empty space of queue 403.

In the next processing, although queues 401, 402, and 403 are filled with tokens, as shown in FIG. 8 (3), the above processing is not carried out for token (121-A3) because either small buffer X1 or X2 of a buffer 201 is filled with unit data. Therefore, unit data A1 is stored in a small buffer X1 of a buffer 203 and unit data A2 is stored in a small buffer X2 of a buffer 202. Then, a token (123-A2) is stored in a lower level token storage area 41N–1 of the empty space of the next queue 402 and a token (122-A3) is stored in a lower level token storage area 41N-1 of the empty space of a queue 403.

Similarly, in the next processing, since either small buffers X1 or X2 of a buffer 201 is filled with unit data although queues 401, 402, and 403 are filled with tokens, as shown in FIG. 8 (4), the above processing is not carried out for token (121-A3). Therefore, unit data A1 is stored in a small buffer X1 of a buffer 204 and unit data A2 is stored in a small buffer X2 of a buffer 203. Then, a token (124-A2) is stored in a lower level token storage area 41N–1 of the empty space of the next queue 402 and a token (123-A3) is stored in a lower level token storage area 41N–2 of the empty space of a queue 403.

In this way, K tokens which are stored in all the queues are processed at substantially the same time, N tokens are processed sequentially in one queue, and unit data is stored in the small buffers X1 and X2 of each buffer.

Therefore, since the processing of queues holding N tokens is carried out within the processing time of a user terminal, the data of work A is outputted sequentially to N user terminals and the work A can be processed (displayed) on the N user terminals at substantially the same time.

In addition, since the dynamic image data of a work is stored as unit data distributed to K storage devices, each unit data can be read at substantially the same time from each storage device. In this way, unit data can be supplied from all the storage devices to user terminals at substantially the same time. Therefore, each of K storing means becomes capable of supplying data to N user terminals. The same or any work can be processed at substantially the same time in the maximum M (=N * K) number of user terminals.

Next, tile second embodiment will be explained below. The second embodiment is an example of transmitting data through a digital circuit. Since the second embodiment is substantially similar to the first embodiment above, the detailed explanation of the same portion is omitted and the portions different from those of the first embodiment will be explained.

Figure 9:
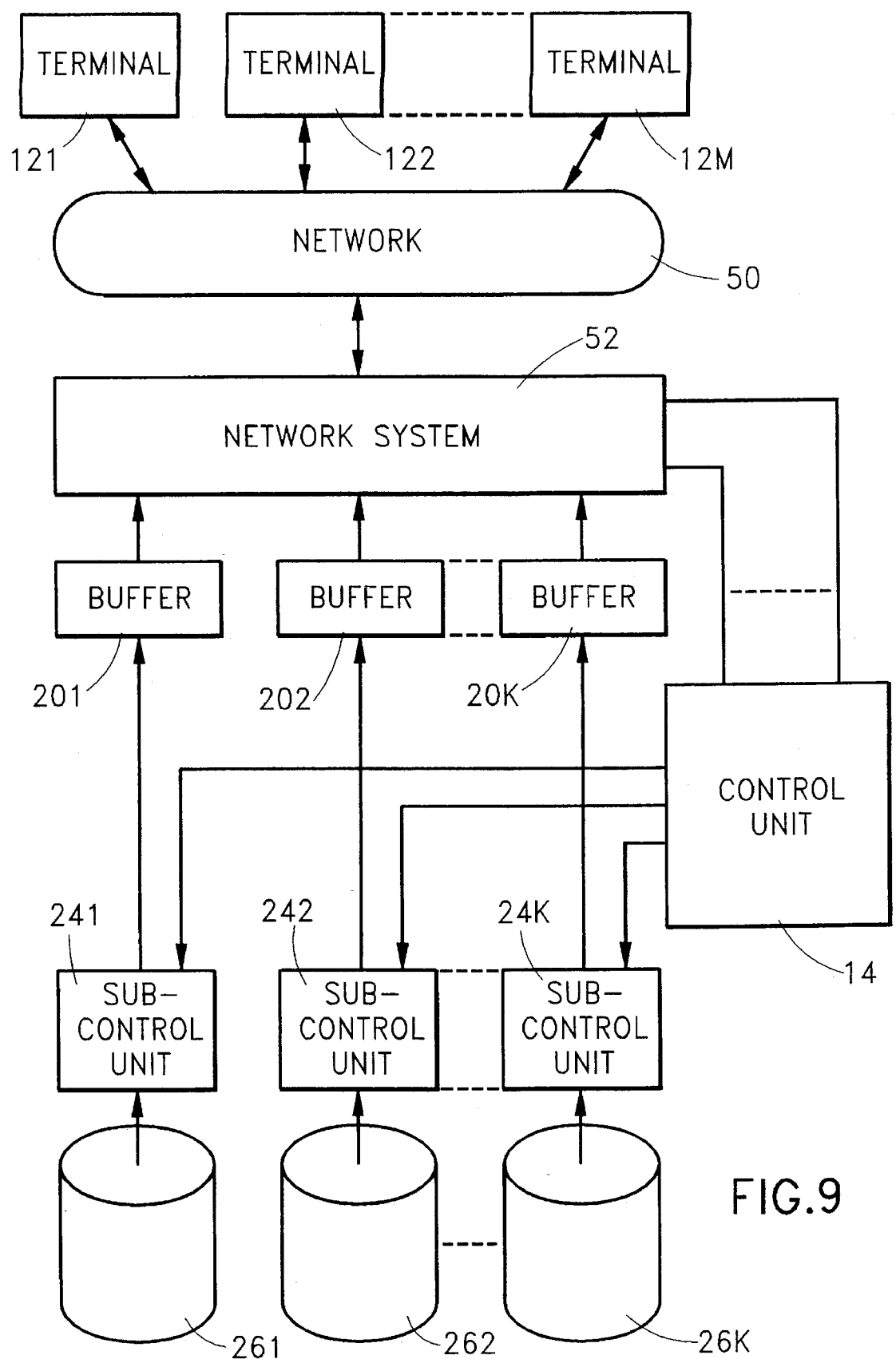
FIG. 9 is a schematic block diagram illustrating a data supplying apparatus of the second embodiment according to the invention.

User terminals 121–12M of the second embodiment are constituted such that expanders and DA converters are incorporated and inputted unit data is displayed as images. User terminals 121–12M are connected with a network 50, as shown in FIG. 9. This network 50 is connected with a network system 52 having functions similar to said changeover switch 22. This network system 52 is connected with a system control unit 14 for supplying request signals of user terminals 121–12M and is connected with storage devices 261–26K through sub-control units 241–24K and buffers 201–20M so that the unit data of storage devices 261–26K are supplied through sub-control units 241–24K and buffers 201–20M. In addition, the system control unit 14 is connected with sub-control units 241–24K.

Since the time required for data transfer can be made short because a digital circuit is used in the second embodiment, each capacity is constituted of 2 * P * N bits with respect to buffers 201–20M. In addition, since the unit data of a work requested by a user terminal is outputted to a corresponding user terminal by the network system 52, the transmission from storage devices to buffers is carried out independently without passing through the switch and the unit data is outputted to the network system 52 from buffers.

This network system 52 can access to all the buffers 201–20M and transmit the unit data in the buffers to user terminals.

Therefore, in the second embodiment, when the processing speed of the user terminal is taken as speed. D, dynamic image data can be supplied to W user terminals if the data transfer rate of the network system is D * W bits or more.

Furthermore, said network system 52 can also be designed to be that, when the connection with buffers is changed over, the system control unit 14 outputs an access right to the network system 52 to read (access) unit data from the buffers.

As explained above, according to the invention, one piece of data having continuity is supplied sequentially from a plurality of storing means to processing means in a predetermined order for each unit data in which one piece of data is divided into multiple parts. Therefore, the reading of data can be distributed and the storing means can be effectively used.

In addition, there is an effect that the data having continuity without breaks can be supplied to processing means by reading unit data in a predetermined order from a plurality of storing means.

Furthermore, since unit data is read based on this queue by providing each storing means with queues storing N tokens in response to a request from a processing means, unit data can be outputted from each of the storing means to a corresponding processing means at substantially the same time, and data such as dynamic image data can be supplied without interruption to processing means N times the number of storing means while one unit data is processed by the processing means.

We claim:

1. Apparatus for supplying a dynamic digital image data file to a multiplicity of individual user terminals on demand, comprising:

a multiplicity of storage devices for storing a dynamic digital image data file partitioned into individual data units, successive ones of said data units being stored on different ones of said storage devices;

a request processing unit for receiving requests on demand from user terminals for a copy of said image data file;

a directory for storing information identifying each of said stored data units and the storage device upon which said each data unit is stored;

a storage device control unit associated with each said storage device, each said storage device control unit including means for storing a token queue for said associated storage device, each said storage device servicing tokens from its associated token queue, each said token specifying a particular individual data unit and a particular destination user terminal for said particular individual data unit;

a communication network for receiving copies of said individual data units corresponding to said tokens in said token queues from said storage devices and for delivering received data units to said user terminals in accordance with the destination user terminal specified in said tokens;

said request processing unit producing said tokens and distributing said tokens to respective token queues in response to received requests from user terminals for a copy of said image data file and in response to said information stored in said directory, each said token being distributed to the token queue of the storage device identified in said directory as the storage device upon which the data unit specified in said each token is stored, said tokens being produced and delivered to said queues so as to deliver a copy of said file on demand to each requesting user terminal, said copy being delivered to each requesting user terminal as successive data units taken from successively different ones of said storage devices, thereby allowing a maximum number of on demand requests for a copy of said file to be serviced simultaneously.

2. Apparatus for supplying a dynamic digital image data file to a multiplicity of individual user terminals on demand, comprising:

a multiplicity of storage devices for storing a dynamic digital image data file partitioned into individual data units, successive ones of said data units being stored on different ones of said storage devices;

control means for receiving requests on demand from user terminals for a copy of said image data file, said control means including a table associating each of said data units with the storage device upon which said each data unit is stored;

a multiplicity of token queues, each said token queue corresponding to an individual one of said storage devices, each said storage device servicing tokens from the token queue corresponding thereto, each said token specifying a particular individual data unit and a particular destination user terminal for said particular individual data unit;

a communication network for receiving copies of said individual data units corresponding to said tokens in said token queues from said storage devices and for delivering received data units to said user terminals in accordance with the destination user terminal specified in said tokens;

said control means producing said tokens and distributing said tokens to respective token queues in response to received requests from user terminals for a copy of said image data file, each said token being distributed to the token queue of the storage device associated in said table with the data unit specified in said each token, said tokens being produced and delivered to said queues so as to deliver a copy of said file on demand to each requesting user terminal, said copy being delivered to each requesting user terminal as successive data units taken from successively different ones of said storage devices, thereby allowing a maximum number of on demand requests for a copy of said file to be serviced simultaneously.

* * * * *